No. 716,632. Patented Dec. 23, 1902.
F. W. GASPER.
COMBINED HANDLE AND PRESSER FOOT FOR BASKETS.
(Application filed Dec. 30, 1901.)
(No Model.)
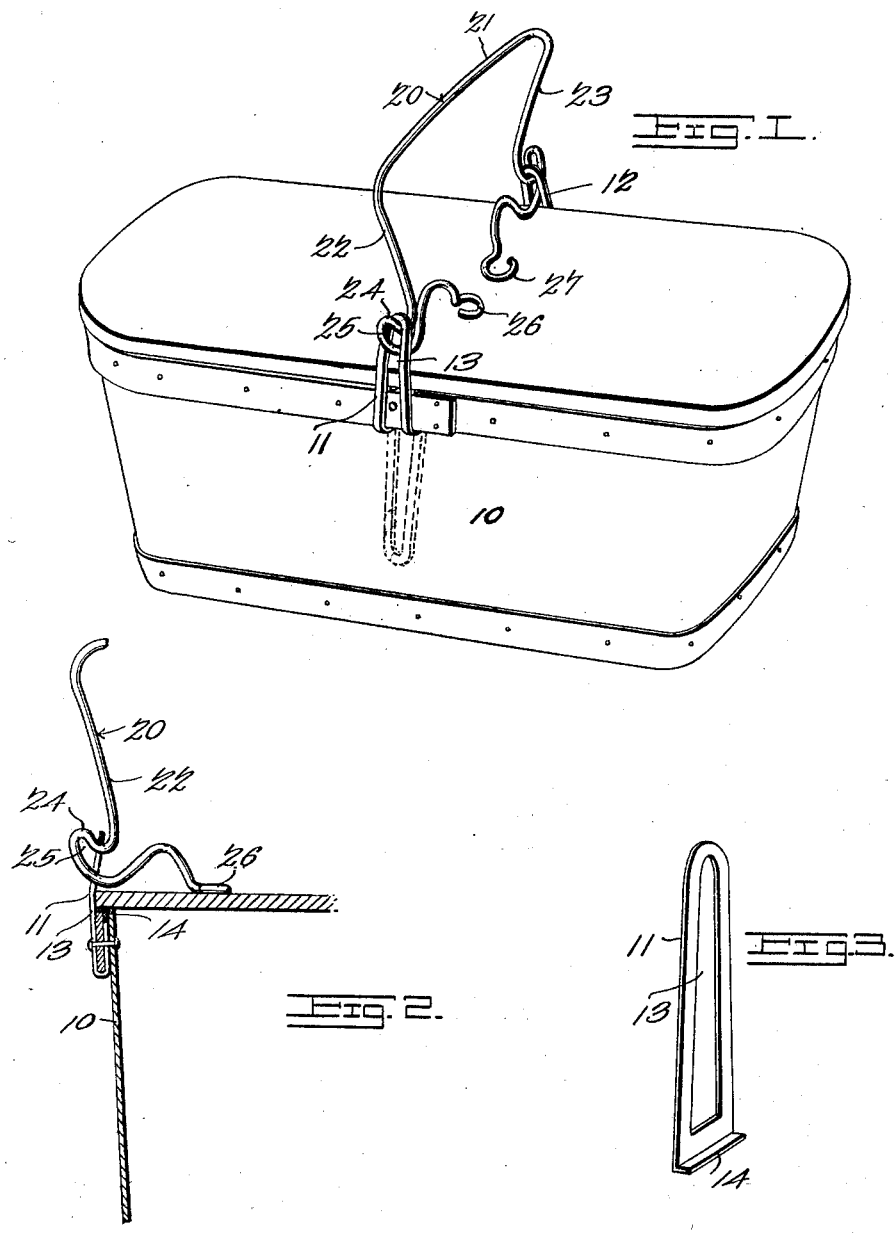
Witnesses
F. W. Gasper, Inventor.
by
Attorneys United States Patent Office.

FRANK W. GASPER, OF WAYNE, NEW YORK, ASSIGNOR OF ONE-HALF TO JOHN T. ANDREWS AND FRED W. GRISTOCK, OF PENN YAN, NEW YORK.

COMBINED HANDLE AND PRESSER-FOOT FOR BASKETS.

SPECIFICATION forming part of Letters Patent No. 716,632, dated December 23, 1902.

Application filed December 30, 1901. Serial No. 87,773. (No model.)

*To all whom it may concern:*

Be it known that I, FRANK W. GASPER, a citizen of the United States, residing at Wayne, in the county of Schuyler and State of New York, have invented a new and useful Combined Handle and Presser-Foot for Baskets, of which the following is a specification.

This invention relates to a combined handle and presser-foot for baskets.

The object of the invention is to provide a detachable handle for a basket which is adapted to engage ears on the sides of the basket and bend them in to hold the edges of the cover down, while the presser-feet of said handle serve to hold the cover down in the middle.

Figure 1 of the accompanying drawings represents a perspective view of a grape-basket, showing this improved handle applied thereto. Fig. 2 represents a transverse vertical section through one side of the basket and cover, showing a vertical section of the ear and one end of this improved handle applied thereto. Fig. 3 represents an enlarged detail view of the ear detached.

The same reference-numerals indicate corresponding parts in all the figures.

An ordinary grape-basket 10 is shown provided on its opposite sides with ears 11 and 12 for attachment to a handle. These ears are preferably formed of sheet metal having tapering longitudinal slots, as 13, therein, and they are secured between the body of the basket and the top band thereof, as clearly shown in Fig. 2, and are provided at their upper ends with angular flanges, as 14, for engaging the upper edges of the band. These ears are preferably attached to the basket between the body and the top hoop thereof, and before being packed or when manufactured these ears lie flat against the sides of the basket, as shown in dotted lines in Fig. 1. After the basket has been packed and the top placed thereon these ears 11 and 12 are bent up ready to be engaged by the handle, now to be described. The outer ends of the slots are made, preferably, just large enough to engage the handle.

The handle 20 preferably comprises a horizontal portion or bar 21, having downwardly-extending angular members 22 and 23, which converge toward their lower ends. These members 22 and 23 are then bent outwardly and upwardly at 24 and then downwardly and inwardly, forming loops, as 25. The lower members of these loops then curve upwardly and then downwardly to form feet, which terminate in ring-shaped loops 26 and 27, which are adapted to engage the cover of the basket and bear thereon. This handle is preferably made of heavy wire and of any suitable size, and the loops 26 and 27 may be disposed on opposite sides.

When it is desired to attach the handle to the basket, the cover is placed thereon, the ears 11 and 12 bent upward, and the loops, as 25, are projected through the slots, as 13, in the ears 11 and 12, and these ears fit into the bends of the handle at 24 and are held therein by the upwardly-bent ends of the loops, as 25. The presser-feet, in the form of the ring-shaped loops 26 and 27, engage the center of the basket-cover and clamp it tightly at this point and also serve as a non-rocker for the handle. The lower members of the loops, as 25, extend down to a point near the top of the basket, but do not touch it. The object of this feature is to provide for the handle being pressed down without disengaging it from the basket, as well as its adaptability for a thin or thick cover. The handle being constructed of this peculiar form is slightly narrower than the width of the basket and its top and occupies no unnecessary room when packed. Another advantage derived from this peculiar construction of the handle is that the inwardly-bent engaging curves 24 tend to bend the ears 11 and 12 inward over the edge of the cover and clamp it to the basket at that point.

I claim as my invention—

1. In a device of the class described, the combination with a receptacle provided at its top with an exterior band, of flexible ears secured between the band and the body of the receptacle and adapted to lie against the exterior of the same before the cover is applied and capable of being bent upward and inward over the cover and into engagement with the edges thereof, and a handle for holding the ears in engagement with the cover, substantially as described.

2. In a device of the class described, the combination with a receptacle, of flexible ears secured to the body of the receptacle and adapted to lie against the exterior of the same before the cover is applied and capable of being bent upward and inward over the cover and into engagement with the side edges thereof, and a handle detachably interlocked with the ears and holding the same in engagement with the cover, substantially as described.

3. In a device of the class described, the combination with a receptacle provided at the top with an exterior band, of flexible ears secured between the band and the body of the receptacle and provided with flanges at their inner ends to engage the upper edge of the band, said ears being slotted and adapted to lie against the exterior of the receptacle before the cover is applied and being capable of being bent inward over the cover and into engagement with the edges thereof, and a handle for holding the ears in engagement with the cover, substantially as described.

4. In a device of the class described, the combination of a pair of ears designed to be secured to a receptacle at opposite sides thereof and having openings, and a handle provided at opposite sides with outwardly-projecting hooks for detachably engaging the ears and having inwardly-extending feet for engaging the cover, substantially as described.

5. In a device of the class described, the combination of a pair of ears, and a handle provided at opposite sides with outwardly-extending hook-shaped loops for detachably engaging the ears and having inwardly-extending feet for engaging the cover of a receptacle, substantially as described.

6. In a device of the class described, the combination of a pair of flexible slotted ears adapted to be bent inward into engagement with the side edges of a cover, and a handle provided at opposite sides with outwardly-extending hook-shaped loops for engaging the ears to retain the same in engagement with the cover and having inwardly-extending arms for engaging the cover beyond the edges thereof, substantially as described.

7. In a device of the class described, the combination with a receptacle, of a pair of flexible ears secured to the receptacle at opposite sides thereof and adapted to lie against the sides of the same, said ears being bent inward over the cover of the receptacle and engaging the side edges thereof, and a handle provided at opposite sides with hook-shaped loops for engaging the ears and having inwardly-extending resilient arms engaging the cover beyond the edges thereof, substantially as described.

In testimony that I claim the foregoing as my own I have hereto affixed my signature in the presence of two witnesses.

FRANK W. GASPER.

Witnesses:
AUGUSTUS W. FRANKLIN,
H. C. ANDREWS.